July 25, 1967  E. T. SCHONHOLZER  3,333,204
APPARATUS FOR PRODUCING PULSES HAVING
ADJUSTABLE PHASE AND UNIFORM WIDTH
Filed Aug. 28, 1964  2 Sheets-Sheet 1

WITNESSES:
Bernard R. Gieguer
James F. Young

INVENTOR
Emil T. Schonholzer
BY
Clement J. Poznokae
ATTORNEY

United States Patent Office 3,333,204
Patented July 25, 1967

3,333,204
APPARATUS FOR PRODUCING PULSES HAVING ADJUSTABLE PHASE AND UNIFORM WIDTH
Emil T. Schonholzer, Depew, N.Y., assignor to Westinghouse Electric Corporation, Pittsburgh, Pa., a corporation of Pennsylvania
Filed Aug. 28, 1964, Ser. No. 392,737
1 Claim. (Cl. 328—63)

This invention relates to pulse generating apparatus, and more particularly to apparatus for generating output pulses having uniform width but whose phase position varies in dependence on the dimension of a control signal variable, for example current or voltage.

Although a thyristor (solid state controlled rectifier) can be fired with a relatively narrow pulse, there are many circuits that require a phase overlap of conduction between consecutively fired thyristors. In such cases a gate pulse of a predetermined minimum width is required to insure that the proper conduction overlap occurs. One method of gating control involves control of conduction time by controlling the firing angle of the valve with a gating signal having a controllable phase angle. Many firing or gating pulse generators provide a "notch-controlled" pulse derived from alternating current i.e., one whose leading edge is phase controlled relative to the parent AC, but whose trailing edge is "fixed." Thus, at large firing angles, for example, near 180° in single phase AC reference systems, the output pulse may be so narrow as to preclude proper firing of the gate controlled valve, especially in the aforesaid cases where conduction overlap is required between consecutively fired thyristors.

The present invention is directed to a pulse forming apparatus which in response to such phase variable pulses of variable width, produces output pulses that follow the phase variations but are of a uniform width sufficient for consistent gating of controlled valves in any system.

Thus, it is a principal object of this invention to provide a novel pulse generator which provides uniform width output pulses whose phase position relative to a reference is controlled in accordance with the dimension of a control signal variable.

Another object of the invention is to provide a pulse generator, which in response to input pulses of variable phase angle and variable width produces uniform width output pulses whose phase position follows that of a reference point of the input pulses.

Another object of the invention is to provide such a pulse generator which will produce output pulses of predetermined uniform width regardless of the duration of the input signal pulses which may be longer or shorter than the uniform width of the output pulses.

Another object of the invention is to provide a novel apparatus for producing and controlling the timing of periodic pulses having uniform width.

Still another object is to provide a novel gating circuit for supplying phase adjustable periodic gating signals of uniform width to a gate controlled valve.

A further object is to provide a relatively simple and economical gating circuit for supplying signal-responsive, phase-adjustable, gating pulses of uniform width to the control electrode of a controllable valve.

The above objects are attained in accordance with one embodiment of the invention wherein a first pulse generator drives a second pulse generator that is provided with a capacitor whose charge state controls the ON-OFF modes of a normally ON first transistor that drives a normally OFF second transistor coupled to an output transformer. In response to a pulse from the first pulse generator, a reference voltage is applied to the capacitor which thereby cuts OFF the first transistor to turn ON the second transistor and pulse the output transformer. The reference volage also initiates a charge change in the capacitor in accordance with the time constant of a charge change path, which change continues until the charge reaches a value that turns ON the first transistor to thereby turn OFF the second transistor. The reference voltage is maintained on the capacitor until the first transistor is turned ON, even after removal of the input pulse, by coupling the capacitor to the proper side of the power supply through the second transistor when it is ON, thus to sustain the output pulse to a uniform length. The term "charge change" includes both "charging" and "discharging." Whether a capacitor is charging or discharging at any particular time depends on the reference point chosen. A condenser which is discharging from one polarity, may be considered to be charging toward the opposite polarity.

Other and further objects and advantages of the invention will be apparent from the following detailed description taken in conjunction with the drawings wherein a preferred embodiment of the invention is illustrated.

Figure 1:
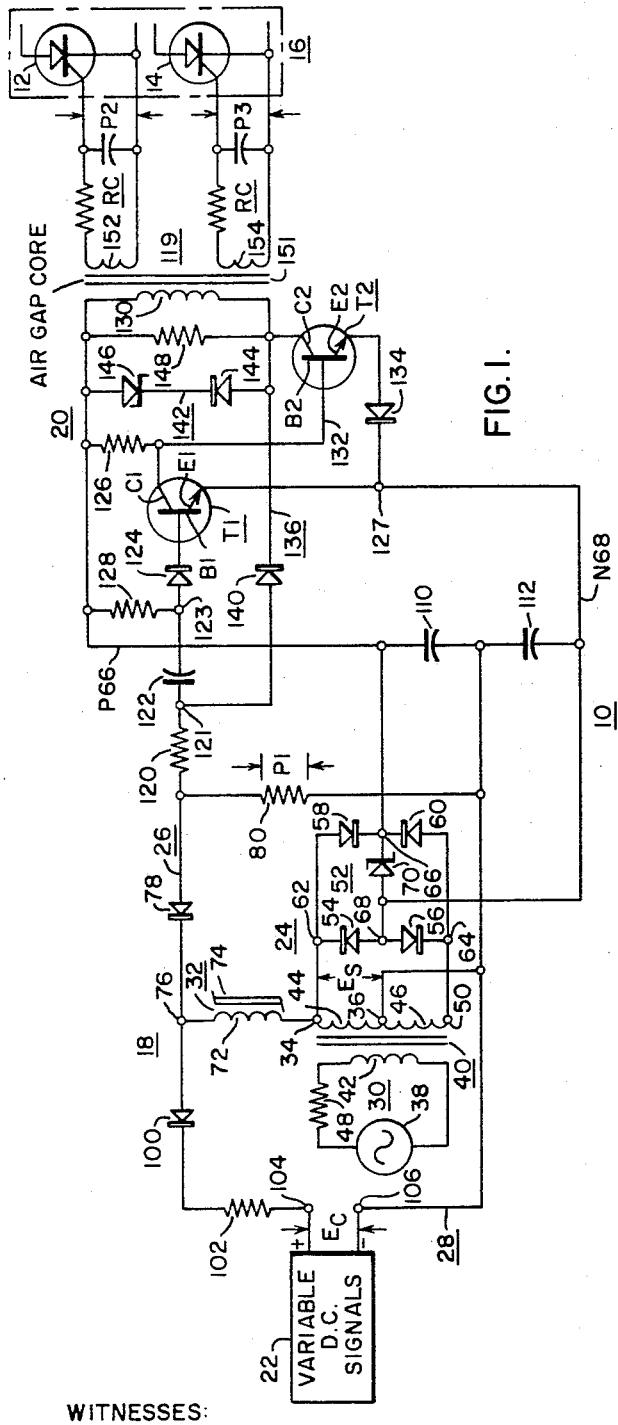
FIGURE 1 is a schematic diagram of one example of a pulse generator built in accordance with the invention.

Referring to FIG. 1 there is shown a pulse producing circuit 10 which supplies gating (firing) pulses to gate controlled valves 12 and 14 of a power circuit 16 controlled by these valves. Although not restricted to such usage, the pulse producing circuit 10 will for convenience be referred to as the gating circuit 10. Although the circuit 10 may be employed in connection with other gated valves such as thyratrons, etc., the circuit is particularly advantageous in combination with solid state gated valves, for example thyristors as shown at 12 and 14.

Included in the firing circuit 10 is a pulse generator 18 whose output drives another pulse generator 20. The pulse generator 18 provides output pulses whose width and phase are variable in response to the dimension of a control signal variable, for example magnitude of voltage of an input control signal source 22. The output pulses of generator 18 are supplied as input pulses to generator 20. In response to the variable phase, variable width, output pulses of generator 18, the generator 20 produces output pulses of uniform width but variable in phase in accordance with the phase of the generator 18 output pulses.

By way of example, the pulse generator 18 is in the form of a flux reset type magnetic amplifier 24 having a load branch 26 and a control branch 28. The respective branches are energized on opposite half cycles of a common AC supply circuit 30 to apply oppositely sensed magnetizing forces during alternative half cycles of the AC to a saturable reactor 32. Branches 26 and 28 are connected across a series circuit including reactor 32 and output terminals 34 and 36 of the AC supply source 30.

The power supply circuit 30 includes an input circuit connected to a suitable source 38 of alternating current. By way of example, the AC supply circuit 30 is shown as including a transformer 40 having an input or primary winding 42 and a center-tapped secondary or output winding having sections 44 and 46 on opposite sides of the center tap 36. The input winding 42 is connected through a dropping resistor 48 to the source 38. The lower end of winding section 46 is connected to a terminal 50. Branches 26 and 28 are energized from the upper secondary section 44 through terminals 34 and 36. If a common cyclic reference is required for the power-circuit 16 and the gating circuit 10, the power for circuit 16 may be obtained from the AC source 38 through suitable isolating transformers.

Preferably, branches 26 and 28 are energized with alternating polarity square wave voltage to assure substantially uniform magnitude output pulses. In order to supply alternating polarity square waves to the amplifier 24, a limiter circuit 52 is effectively connected across the alternating current supply for the branches 26 and 28 to clip the AC waves. More specifically, the clipper circuit 52 includes a full wave bridge type rectifier formed by diodes 54, 56, 58 and 60, and having AC input terminals 62 and 64 connected to AC output terminals 34 and 50 of the AC supply circuit 30. The DC (direct current) output diagonal of the bridge includes DC output terminals 66 and 68, and a voltage threshold device 70 for example a Zener diode connected between terminals 66 and 68. The AC waves are limited at the threshold voltage value of the threshold device. In the case of a Zener diode, the clipping takes place at the Zener level or breakdown voltage value. The clipping action is applied to the full secondary 44–46 on each half cycle. This is of particular advantage because of the poor regulation encountered in small transformers. The clipped AC voltage $E_S$ at the AC output terminals 34 and 36 is shown at $E_S$ in FIG. 2 (A), while the line voltage $E_L$ of source 38 is shown at $E_L$ in this figure.

Reactor 32 has a winding 72 inductively coupled with a magnetically saturable core 74. The core is preferably made of "square loop" magnetic material, that is, magnetic material having a substantially rectangular or parallelogram shaped hysteresis loop to provide sharp saturating characteristics. The upper end of winding 72 is connected to a junction 76, while the lower end is connected to AC supply terminal 34.

Load branch 26, which is connected between junction 76 and AC supply terminal 36, includes in series an asymmetric current device 78 such as a diode or rectifier, and a load impedance 80, for example the resistor shown thereat. The output of amplifier 24 is developed across resistor 80.

The control branch 28, which is connected between junction 76 and AC supply terminal 36, includes in series an asymmetric current device 100 such as a diode or rectifier, a resistor 102 and a control input circuit including input signal terminals 104 and 106 for receiving control signals, for example from a low impedance source 22 of variable magnitude DC control signals.

The operation of the pulse generator 18 may be understood from the following explanation. It will be noted that diodes 78 and 100 are oppositely related to each with respect to the alternating polarity square wave voltage $E_S$ applied to the branches 26 and 28. Thus branches 26 and 28 can conduct only on opposite half cycles of the applied AC voltage $E_S$. For convenience, that half cycle of the applied AC voltage $E_S$ which forward biases diodes 78 and renders branch 26 conductive will be referred to as the negative half cycle of $E_S$. As a corollary, diode 100 is forward biased and branch 28 is rendered conductive by the positive half cycle of $E_S$. Branch 26, when conductive, drives the core 74 toward saturation of a particular polarity or sense, which for convenience is referred to as positive saturation. Continuing with the same convention, branch 28, when conductive, drives core 74 toward negative saturation. During the conductive half cycle of branch 28 the AC half cycle applied to the branch is opposed by the control signal voltage $E_C$ supplied by source 22.

Continuing with the description of an example of operation, assume first that the control voltage $E_C$ is set to zero. Just prior to the start of a negative half cycle of the applied AC voltage $E_S$, reactor core 74 is in a reset state at a particular flux level far below positive saturation. With zero control voltage $E_C$, reactor 72 is capable of absorbing the full negative half cycle of the applied AC voltage $E_S$, so that as the voltage $E_S$ swings through its negative half cycle, reactor 32 is driven toward but not quite to positive saturation. As a result, the effective impedance of reactor 32 is high, and no output is developed across the output resistor 80. On the next or positive half cycle of the AC voltage $E_S$, diode 100 is forward biased while diode 78 is back biased. During this, the conducting half cycle of branch 28, reactor 32 is driven toward negative magnetic saturation to reset its core at the previous reset flux level.

The cycle is repeated with no output across the load impedance 80 as long as the control signal voltage $E_C$ is maintained at zero. However, when the control signal source 22 is adjusted to raise control voltage $E_C$ to some positive value, the positive half cycle of the applied AC voltage $E_S$ is opposed by the voltage $E_C$, thus reducing the reset action or drive toward negative saturation during the reset or positive half cycle of the AC voltage $E_S$. This resets reactor core 74 to a flux level closer to positive saturation. As a consequence on the next negative or setting half cycle of the AC voltage $E_S$, reactor 32 is driven to positive saturation at a firing angle α, whose value depends on the magnitude of the control voltage $E_C$. Once reactor core 74 is saturated, the effective impedance of the reactor is suddenly reduced, allowing substantial current to flow through branch 22 and applying a substantial voltage across the output resistor 80, which output voltage is supplied as an input signal to the pulse generator 20. The output pulse P1 thus produced across resistance 80 begins at the angle α (FIG. 2) and terminates at the angle θ, the end of the setting half cycle.

During the positive half cycle of the AC voltage $E_S$, the reactor 28 resets to a flux level dependent on the value of the control signal $E_C$. The set and reset flux areas are shown at $A_S$ and $A_R$, respectively, in FIG. 2(B). The vertical heighth of area $A_R$ is substantially $E_S$ minus $E_C$. The circuit keeps recycling to provide an output pulse P1 during each negative half cycle of the AC voltage $E_S$, the leading edge of the pulse having a phase angle or position in time dependent upon the magnitude of the control voltage $E_C$ supplied by the control signal source 22. The phase angle of the pulse front is adjustable by adjusting the magnitude of the control voltage $E_C$. Since the leading edge of the pulse is adjustable in phase while the lagging edge is substantially fixed in phase, the output pulses furnished by the pulse generator 18 in response to different magnitudes of the input signal $E_C$ are variable in phase and variable in width.

The pulse generator 20 includes a normally ON first controllable electric valve T1 which drives a normally OFF second controllable electric valve T2, which in turn drives an output circuit or load impedance, for example a transformer 119. Valve T1 is provided with a control electrode B1, power electrodes C1 and E1, and an internal power path extending from one to the other of the power electrodes. In like manner, valve T2 is provided with a control electrode B2, power electrodes C2 and E2, and a power path between the power electrodes. Each of the valves T1 and T2 is characterized in that current flow through the power path can be respectively turned ON and OFF in response to appropriate signals applied to the control electrode. Valves T1 and T2 are preferably of the solid state type, for example, transistors as shown, wherein the control electrode B is the base, and the power electrodes C and E are the collector and emitter respectively. The power path in each transistor is its collector-emitter path.

Direct current power is supplied to the transistors T1 and T2 from terminals 36, 68 and 66, which constitute a direct current power supply having a positive terminal 66, a negative terminal 68 and a common terminal 36 to which the polarity of terminals 68 and 66 are related. Filter condensers 110 and 112 are connected across the respective halves of the DC power supply. A positive bus P66 is connected to the positive DC power terminal 66, while a negative bus N58 is connected to the negative terminal 68 of the power supply.

Base B1 is coupled to the upper end of load impedance 80 through a resistor 120, a junction 121, a capacitor 122, a junction 123 and a diode 124, all in series connection. Collector C1 is connected through a collector resistor 126 to the positive bus P66, while the emitter E1 is connected to the negative bus N68 through a junction 127. Transistor T1 is normally self-biased to the ON mode through an impedance 128, for example a resistor, connected from the positive bus P66 to the junction 123 between capacitor 122 and diode 124.

Collector C1 is also connected to base B2 of transistor T2 through a line 132. The power path of transistor T2 is connected in series with the primary winding 130 of transformer 119 across the DC power supply by the connection of collector C2, through the primary 130, to the positive bus P66, and a connection from emitter E2 through an asymmetric current device 134 and the junction 127 to the negative bus N68. The asymmetric device 134 is shown by way of example as a diode.

The relationship of transistors T1 and T2 is such that when transistor T1 is ON, its output through line 132 drives transistor T2 OFF. Thus transistor T1 is normally ON while transistor T2 is normally OF. On the other hand when transistor T1 is in the OFF mode, its output through line 132 drives transistor T2 to its ON mode. The forward threshold voltage of diode 134 applies a bias to the base-emitter junction of transistor T2 to prevent transistor T2 from turning on when transistor T1 is turned-on.

The "input" side of capacitor 122 is connected to the negative side of the DC power supply when transistor T2 is ON by means of a positive feedback circuit 136 connected from collector C2 to the junction 121 between resistor 120 and the input side of capacitor 122. The path 136 includes an asymmetric current device 140 for example a diode to block the positive bus P66 from the junction 121.

A commutating path 142 is connected across the primary 130 to commutate the current of the primary when transistor T2 is turned OFF after having been in the ON mode. Included in the path 142 is an asymmetric current device 144, such as a diode, and a threshold device 146, for example a Zener diode as shown. For reasons hereinafter explained, an impedance 148, such as the resistor shown, is connected across the primary 130.

A commutating path 142 is connected across the primary 130 to commutate the current of the primary when transistor T2 is turned OFF after having in the ON mode. Included in the path 142 is an asymmetric current device 144, such as a diode, and a threshold device 146, for example a Zener diode as shown. For reasons hereinafter explained, an impedance 148, such as the resistor shown, is connected across the primary 130.

Transformer 119 is provided with a self-resetting, air gap, magnetic core 151, which in addition to the primary 130, also carries in inductive relation thereto secondary windings 152 and 154. Each of these secondaries is connected, through a resistance-capacitance network RC, across the control electrode and a power electrode of a different one of the valves 12 and 14 in the power circuit 16. The network RC improves the $dv/dt$ capability of the valve it is associated with. More specifically, the output winding 152 is connected across the gate-cathode junction of the thyristor 12, while secondary winding 154 is connected across the gate-cathode junction of thyristor 14. In the case of a thyristor (solid state controlled rectifier), the control, power inlet, and power outlet electrodes, are referred to as gate, anode, and cathode electrodes respectively.

Operation of the pulse generator, Example 20, will be understood from the following description. It is assumed that normal condition obtains when there is no output pulse across the output load resistor 80. At this time transistor T1 is normally ON while transistor T2 is normally OFF, and there is no feedback along path 136. With no output across resistor 80, the input side of condenser 122, because of its connection through junction 121 and resistors 120 and 80 to the common DC supply terminal 36, is at the potential of the common terminal 36. With transistor T1 conducting (normally ON), the output side of the condenser 122 at junction 123 is at a negative potential relative to its input side because of its (output side) connection to the negative bus N68, through junction 123, diode 124 and the base-emitter junction of the now conducting transistor T1.

Suppose that a control signal $E_C$ applied to the control branch 28 of pulse generator 18 causes reactor 30 to saturate at a particular angle $\alpha$, producing an output pulse P1 across the load resistor 80, which pulse is negative at the upper end of the resistor, thus making the junction 121 and the input side of capacitor 122 more negative than it was under the normal condition. Because the capacitor 122 cannot change its charge state instantaneously, the negative increase on the input side of the capacitor is transmitted to its output side which is coupled to the base of transistor T1. As a result transistor T1 is turned OFF. The resultant positive rise on collector C1 turns ON transistor T2, placing the full DC supply voltage across the primary 130 of transformer 119, thereby to initiate output pulses P2 and P3 in the secondaries 152 and 154. In the meantime, the charge state of capacitor 122 changes exponentially in accordance with the time constant of a charge change path including the positive bus P66, resistor 128, capacitor 122, resistors 120 and 80, the common DC terminal 36, and the power supply between common terminal 36 and the positive bus P66. After a predetermined charge state changing time, for example (with the later listed component values), 4.4 milliseconds, the condenser charge state reaches the value that will cause turn ON of transistor T1, thereby restoring the voltage on the output side (junction 123) of capacitor 122 to the initial (normal) condition. Note: When transistor T1 is turned-on the right side of capacitor 122 is reconnected to the negative bus N68 through the low impedance base-emitter junction of transistor T1.

Since the input side (junction 121) of the condenser 122 is connected, through path 136 and the turned ON transistor T2, to the negative bus N68, the changing of the condenser charge is maintained for the aforesaid predetermined time interval (example 4.4 milliseconds) even if the original pulse from reactor 32 disappears earlier.

Figure 2:
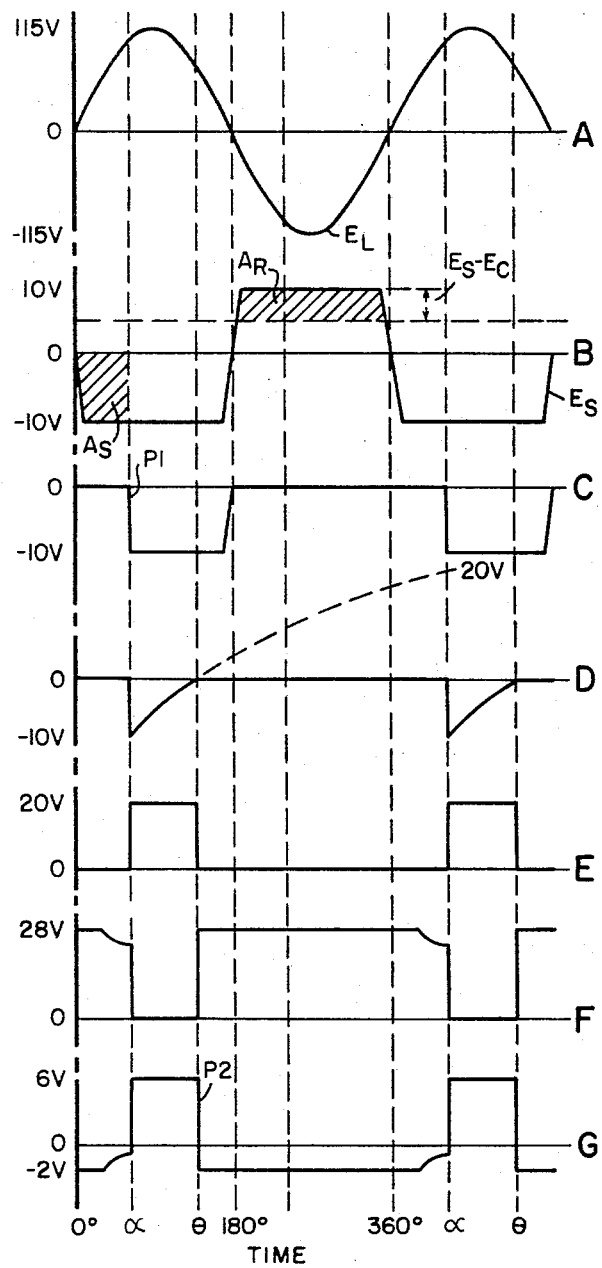
FIG. 2 is a chart showing waveforms occurring at different points of the circuit of FIG. 1.

The output pulse P2 induced in the secondary 152 and illustrated at P2 in FIG. 2, is initiated at approximately angle $\alpha$ by the firing of reactor 32, and is sharply terminated by the collapsing field of transformer core 151 when transistor T2 is turned OFF at the end of the aforementioned predetermined time of condenser charge changing. The pulses P2 and P3 are applied to valves V12 and V14 respectively to fire (gate) the valves.

In the meantime, the voltage applied across the transformer primary 130 during said predetermined charge changing time sets a certain voltage-time integral into the transformer core 151. In response to the turn ON of transistor T1 at the end of the predetermined condenser charge changing time interval, transistor T2 is turned OFF, and the current in the primary 130 is commutated through the path 142 and parallel resistor 148. The transformer core 151 is reset by a reset voltage generated by the field collapse (reactive discharge) of the transformer 119 and having a voltage value determined by a fixed component (the Zener threshold voltage value) and a flexible component (by current through resistor 148).

The Zener valve is selected to make sure that there is sufficient reset voltage to produce a reset voltage-time integral to at least match the setting volt-time integral.

During the reset period, the reset voltage includes an output voltage $E_R$ in the secondaries of a polarity which reverse biases the valves 12 and 14. Reactive discharge current continuing through resistor 148 insures that the reverse bias voltage across the gate-cathode junction of valves 12 and 14 is maintained for a substantial time beyond the period governed by the Zener diode 146.

By way of example, the components in FIG. 1 may have the following values for operation in accordance with the invention.

| | | |
|---|---|---|
| AC source 38 | v | 115 |
| Transformer 40: | | |
| Primary 42 to secondary 44 | ratio | 2:1 |
| Primary 42 to secondary 46 | do | 2:1 |
| Transformer 119: | | |
| Primary to each secondary | ratio | 3:1 |
| Zener diode 70 | v | [1]20 |
| Zener diode 146 | v | [1]8 |
| Capacitors 110 and 112 | mfd | 200 |
| Capacitor 122 | mfd | .47 |
| Capacitors in RC | mfd | .22 |
| Resistor 48 | ohms | 500 |
| Resistors 80 and 102 | do | 220 |
| Resistors 120 and 126 | kilohms | 2.2 |
| Resistor 128 | do | 26.1 |
| Resistor 148 | do | 4.7 |
| Resistors in RC | ohms | 22 |

[1] Zener threshold voltage.

Resistor 48 absorbs the voltage above the clipping line. Resistor 102 limits current and also prevents negative saturation of reactor 32 in response to negative control signals. Resistor 120 limits the current flow out of the capacitor that is due to ripple variation of the DC supply, thus to prevent spurious turn OFF of transistor T1.

With the exemplary component values set out in the above table for the circuit of FIG. 1, the following approximate voltages will occur during the afore-described operation of the circuit: 25 volts AC (clipped) across primary winding 42. The positive DC bus P66 will be at plus (positive) 10 volts relative to common 36, while the negative DC bus N68 will be at minus (negative) 10 volts relative to common 36. Under normal conditions, the capacitor 122 sets with +10 volts on its input side (junction 121) and 0.0 volts on its output side (junction 123), both relative to negative bus N68. Across resistor 80, when reactor 32 fires, there will be 10 volts to apply negative 10 volts on the input side (junction 121) of capacitor 122, momentarily forcing the opposite side of the capacitor from 0.0 volts to minus 10 volts to divert control current from the base B1 and thereby cut off transistor T1. The ensuing change of condenser charge state will be a charge, with the junction 123 side of capacitor 122 charging toward the plus 20 volts of the positive bus P66 but not reaching that value because transistor T1 will turn ON when that side of the capacitor approaches 0.0 volts (from its minus 10 volts momentary peak). Turn ON of transistor T1 reconnects junction 123 side of capacitor 122 to the negative bus N68 through the low impedance of the base-emitter junction of transistor T1, thus terminating the condenser charge at that point.

During the condenser charging interval (example 4.4 milliseconds) between turn OFF and turn ON of transistor T1 (transistor T2 is ON during this interval), a flux setting voltage of 20 volts is applied across the primary 130 of transformer 119. After transistor T2 is turned OFF in response to turn ON of transistor T1 the reactive discharge of transformer 119 applies a reset voltage across the transformer primary 130 which is held to about 8 volts by the Zener diode 146. The amplitude of output pulses P2 and P3 provided by secondaries 152 and 154 is from 1 to 6 volts depending upon the gate characteristics of valves 12 and 14.

Output pulses P2 and P3 are of uniform width (example 4.4 milliseconds). The phase angle of pulses P2 and P3 varies in accordance with the amplitude of the control signal $E_C$ applied to the control signal input terminals 104 and 106 of the system.

Voltage waveforms at various points in the circuit during operation are shown in FIG. 2 (A, B, C, D, F, G and H) as follows, all being related to the same time base FIG. 2:

(A) voltage $E_L$ of source 38;
(B) voltage $E_S$ of secondary 44;
(C) voltage across resistor 80 measured at the upper end of resistor 80 relative to common terminal 36;
(D) voltage at junction 123 relative to negative bus N68 shows condenser charge changing pattern;
(F) collector-emitter voltage across transistor T1;
(G) collector-emitter voltage across transistor T2; and
(H) output of transformer secondary 152 (secondary 154 is the same).

Figure 3:
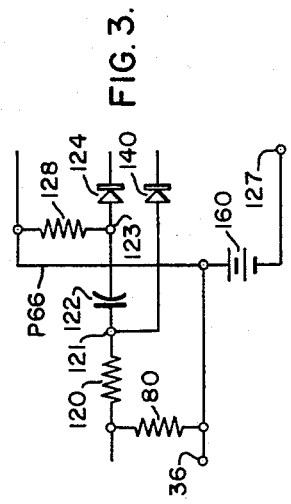
FIG. 3 is a diagram of a fragment of the circuit of FIG. 1 modified to illustrate a different form of DC power supply for the second pulse generator in FIG. 1.

Instead of the DC power supply from terminals 66 and 68, the pulse generator 20 may be supplied from a separate DC power supply such as a battery 160 as shown in FIG. 3, wherein only a fragment of the circuit of FIG. 1 is shown. In FIG. 3 the positive and negative buses P66 and N68 are connected to the battery 160 instead of the terminals 66 and 68. The lower end of resistor 80 is returned to the positive side of the battery 160. The circuit of FIG. 1 modified as in FIG. 3 operates in substantially the same manner as the unmodified circuit of FIG. 1.

Although transistors T1 and T2 are shown as NPN transistors, it will be appreciated that NPN transistors may be employed by making the appropriate polarity reversals of the associated signals and voltages applied to the transistors. The herein referred to ON and OFF modes of transistors T1 and T2 are preferably saturation and cutoff, respectively, to operate the transistors in the switching mode.

From the description herein it should be apparent that the present invention provides a novel pulse generator which produces uniform width output pulses having a phase angle which is variable in accordance with the variations of a controlled signal variable, and wherein it is immaterial whether the input signals are longer or shorter than the uniform width of the responding output pulses.

It is to be understood that the herein described arrangements are simply illustrative of the principles of the invention, and that other embodiments and applications are within the spirit and scope of the invention.

I claim as my invention:

In pulse generating apparatus, a signal responsive first pulse forming circuit which provides first output pulses having a variable phase and variable width, which dimensions are controlled in accordance with the variation of a dimension of a control signal applied to said first pulse forming circuit, said first pulse forming circuit having output impedance means across which said first output pulses appear, said first output pulses having particular polarity at one end of said output impedance means and the opposite polarity at the other end of the output impedance means, a second pulse forming circuit coupled to said output impedance means and responsive to said first output pulses for providing second output pulses of uniform width but whose phase angle follows the phase angle of said first output pulses, said second pulse forming circuit comprising first and second electric valves each having a control electrode and first and second power electrodes and an internal power circuit extending from one to the other of its power electrodes, a direct current power supply having respective output terminals of said particular and the opposite polarities, said first and second valves each having respective ON and OFF modes of operation, said first valve being normally ON, said second valve being OFF and ON in response to said first valve being ON and OFF respectively, a capacitor, means coupling one side of said capacitor to said one end of said output impedance means, means coupling the opposite side of said capacitor to the control electrode of said first valve, a transformer having a magnetic core and respective input and output circuits, a series circuit including said transformer input circuit and the internal power circuit of said second valve connected across said power supply, a series circuit including the internal power circuit of said first valve connected across said power supply, a charge changing path connected across said capacitor and which includes such output impedance means and second impedance means, said second impedance means coupling said opposite side of the capacitor to said opposite polarity output terminal of said power supply, means coupling said one side of the capacitor to said particular polarity output terminal of said power supply through the internal power path of said second valve when said second valve is ON, a commutating path having a predetermined threshold voltage connected across said transformer input circuit, said threshold voltage being such as to allow full flux reset of the transformer core while providing a safe reactive discharge of the transformer, a pulse responsive utilization circuit connected to said transformer output circuit, said utilization circuit including a controllable third electric valve which is fired by said second output pulses, said transformer while being reset applying a reverse bias to said valve, and third impedance means connected across said transformer input circuit for prolonging reactive discharge of the transformer in the reset direction thereby to prolong reverse bias on said valve.

References Cited

UNITED STATES PATENTS 3,121,309    4/1964    Blocher            307—88.5
3,247,458    4/1966    Noyes             328—207

ARTHUR GAUSS, *Primary Examiner.*

B. P. DAVIS, *Assistant Examiner.*